United States Patent
Justice

(10) Patent No.: US 9,560,029 B2
(45) Date of Patent: *Jan. 31, 2017

(54) PUBLICLY AVAILABLE PROTECTED ELECTRONIC MAIL SYSTEM

(71) Applicant: James Robert Justice, San Francisco, CA (US)

(72) Inventor: James Robert Justice, San Francisco, CA (US)

(73) Assignee: James R. Justice, San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/503,411

(22) Filed: Oct. 1, 2014

(65) Prior Publication Data

US 2016/0072782 A1    Mar. 10, 2016

Related U.S. Application Data

(63) Continuation of application No. 14/483,038, filed on Sep. 10, 2014.

(51) Int. Cl.
*H04L 29/06* (2006.01)
*H04L 12/58* (2006.01)
*G06F 15/16* (2006.01)
*G06F 7/04* (2006.01)
*G06F 17/30* (2006.01)

(52) U.S. Cl.
CPC ............... *H04L 63/08* (2013.01); *H04L 51/00* (2013.01); *H04L 63/0428* (2013.01)

(58) Field of Classification Search
None
See application file for complete search history.

(56) References Cited

U.S. PATENT DOCUMENTS

| 8,359,360 B2* | 1/2013 | Logue | H04L 12/585 709/206 |
| 2006/0053280 A1* | 3/2006 | Kittle | H04L 63/0428 713/156 |
| 2006/0095514 A1* | 5/2006 | Wang | G06Q 10/107 709/204 |
| 2009/0198997 A1* | 8/2009 | Yeap | H04L 63/0823 713/155 |
| 2011/0276638 A1* | 11/2011 | Errico | G06Q 10/107 709/206 |

* cited by examiner

*Primary Examiner* — Shin-Hon Chen
(74) *Attorney, Agent, or Firm* — Gutride Safier LLP

(57) ABSTRACT

A secure messaging system provides a secure messaging exchange service to identified user. In one embodiment, the System comprises a User Record Server (URS) comprising a plurality of Private Electronic Mail (PEM) user accounts. A Secure Mail Delivery Agent (SMDA) provides a storage area for inbound sMail upon authentication via the URS that a Sender ID bundle in a message header of each incoming message matches the Sender ID of at least one of said plurality of PEM user accounts before delivering said incoming message. A first Secure Mail Transfer Agent (SMTA), coupled via a first encrypted connection to said SMDA and via a second connection to a public network, is configured to insert a Sender ID bundle into sMail headers when routing outbound sMail, and further configured to establish encrypted channels for the transmission of sMail over a public network.

21 Claims, 6 Drawing Sheets

PUBLICLY AVAILABLE PROTECTED ELECTRONIC MAIL SYSTEM

RELATED APPLICATIONS/PRIORITY CLAIM

This application claims priority under 35 USC 119(e) and 35 USC 120 from U.S. provisional patent application Ser. No. 61/491,071 filed on May 27, 2011 and entitled "Publically Available Protected Electronic Mail System (PEMS)" which is incorporated herein by reference.

FIELD OF THE INVENTION

The invention is related to a system and method for the secure exchange of electronic mail.

BACKGROUND OF THE INVENTION

The current state of the public email system is a mess. The public email system or common email system was originally designed as a simple way to send written communication utilizing a burgeoning internet. Early Users were college professors and government personnel who were inherently trusted individuals who had little reason to perpetrate scams or spam. Accordingly, email was not designed with security in mind. On the contrary, the current public email system has been built with anonymity and unlimited public access as a priority. It is these two characteristics which have ultimately proved to limit the functionality of email to the transfer of non-sensitive information. Today, anyone anywhere can send as many emails as they wish to send, to as many people as they wish from an anonymous address. A sender of an email has no control over the security procedures of a recipient in an email transaction and the sender lacks visibility into the channel and thus cannot verify the legal identity of the recipient before a message is sent, whereby the legal identity is the identity which is same identity represented to the government for the individual or business.

Due to the lack of controls for identifying the sender and holding the sender accountable, the current email system is wrought with scams and spam, marketing email messages sent to mass audiences of recipients who did not opt to receive these messages, usually from an anonymous source. Spam filters are well know technologies that attempt to filter spam messages prior to those messages reaching an recipient's inbox and are only partially effective, creating a nuisance for recipients. Just as importantly, false positives by spam filters (falsely identifying legitimate email as spam) are detrimental to the current email system. False positives on spam filters filter out a significant portion of legitimate and even important mail and there is absolutely no assurance that an email sent will ever reach its destination. This lack of assurance is a major factor that prohibits email from being used for many purposes where the sender needs reasonable certainty that a message has been received and that the message was sent to the correct person.

The security of the email path is also a major problem with the current public email system. A sender of an email has little assurance that the message will be encrypted throughout its electronic path to the recipient. In fact, it is highly likely that the email message will be unencrypted at some point in its path. This allows sophisticated sniffers to be used by hackers to detect and fetch sensitive information in email traffic, enabling vast opportunity for theft and fraud.

Thus, it is desirable to provide a Publicly Available Protected Electronic Mail System that overcomes the limitations of the conventional email system and the current email system's inability to provide a secure and protected medium for the exchange of sensitive messages, and it is to this end that the present invention is directed.

SUMMARY OF THE INVENTION

A Publicly Available Protected Electronic Mail System ("PEMS") and method are provided. The system has a centralized, internet based identity and authentication server which authenticates sender and recipient and provides for routing of secure electronic mail ("sMail") over a virtual private network ("VPN"). A VPN is a network that uses a public network such as the internet to transfer information using secure methods. The "Protected Electronic Mail" ("PEM") architecture provides for a uniquely protected access to the PEM VPN via an identity and authentication gateway which allows the system to be publically accessible and usable by anyone who wishes to use the system yet simultaneously protects all users of the system.

The PEM architecture provides a vast technical improvement over current methods for routing email and secure email, resulting in a user-friendly system which provides assurance in the electronic mail channel. This includes assurance of the assurance of security of the message path and assurance of the legal identity of the sender and recipient to the opposite party in the exchange when transacting or exchanging electronic mail.

A PEM system effectively deployed and utilized can create a positive environmental impact by reducing the current reliance on paper letters. Further, PEM can provide added value to the transaction that ensure levels of security, User protection and 'guaranteed delivery' that far exceed standard email, facsimile or any physical mail system.

Figure 1:
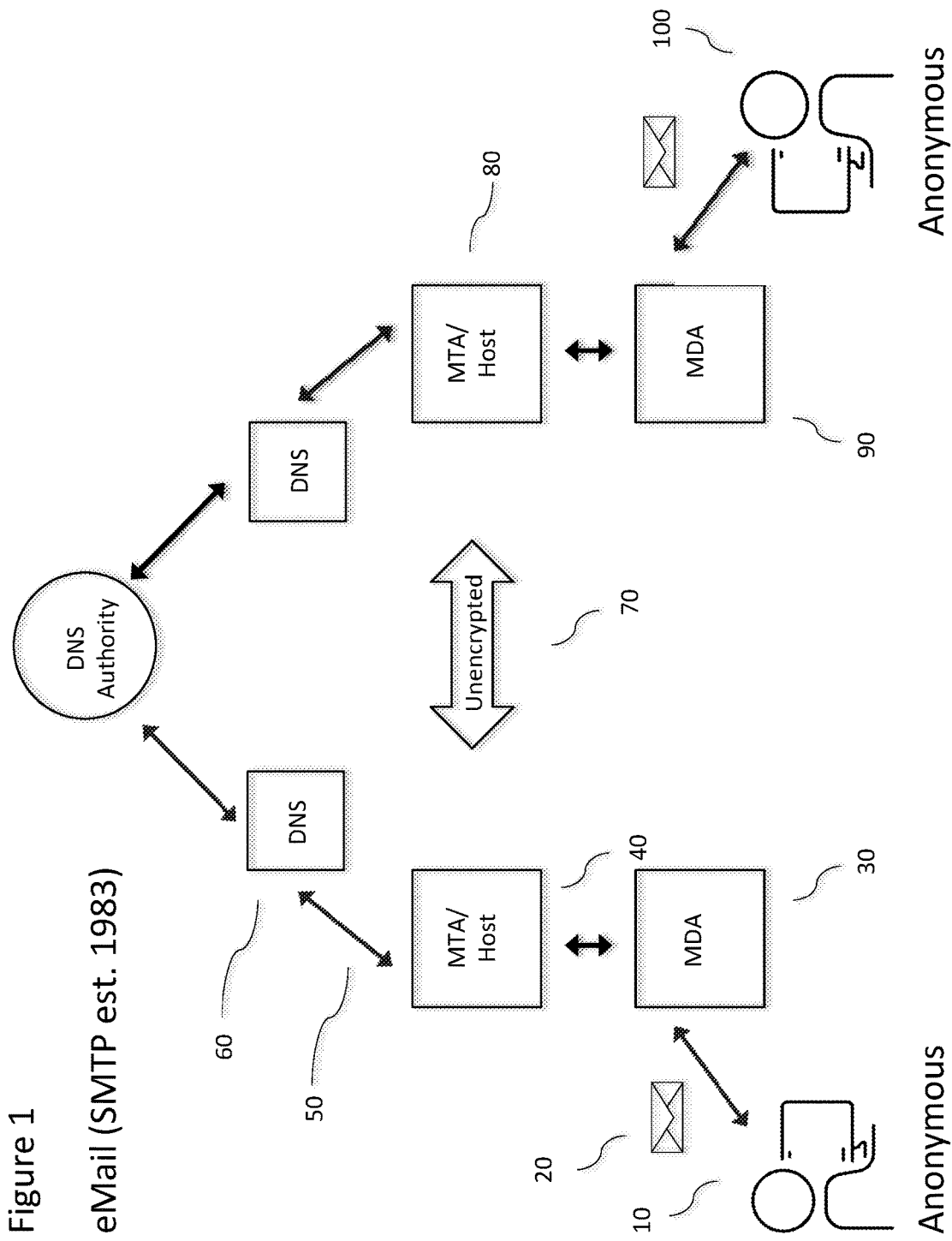
FIG. 1 is a diagram illustrating the architecture of the current publically available email system.

DETAILED DESCRIPTION OF THE PREFERRED EMBODIMENT (See FIG. 1). A typical email exchange between two parties on the internet currently functions as follows. A Sender 10 creates an Email Message (Email) 20 using an Email Client. An Email Client can be software loaded locally on a computing device or can be provided by a remote computer via a website user interface (UI), popularly known as "webmail," or by other means. The Sender 10 enters and email address for the Recipient 100 into the Email Client. The email address contains a user identifier part and a domain identifier part. For example, in the email address, judy@thisdomain.com, "judy" is the user identifier part and "thisdomain.com" is the domain identifier. When the Sender chooses to send the Email, the email client sends the Email 20 via the internet to a Mail Delivery Agent (MDA) 30.

A Sender 10 can opt-in to using an encrypted channel when connecting between the Email Client and the MDA 30, however there is no system requirement to do so. The MDA then passes the email message to a Mail Transfer Agent (MTA) 40. Note that the MDA/MTA functions are sometimes combined in the same computing device where a "computing device" consists of computer hardware running computer software. The MTA 40 performs a DNS Lookup 50 to determine the internet location (IP address) of the appropriate MTA 8 which represents the Recipient's 10 domain (as indicated by the domain identifier in the email address). The MTA 4 then sends the Email 20 to the MTA 80 via the internet. The current internet protocols for email currently do not require that communications between MTAs be encrypted. Thus, it is very likely that the Email 20 travels through Unencrypted Channels 70 between MTAs. In fact, the Email typically travels through multiple MTAs before reaching the final MTA 80 of the recipient. The Recipient's MTA 80 then forwards the email to the Recipient's MDA 90. The Recipient's 100 Email Client then typically fetches the email from the MDA 90. The Recipient's client 100 can opt-in to using an encrypted channel when connecting between the Recipient's Email Client and the MDA 90, however there is no system requirement to do so.

Using the conventional system, at least three characteristics present critical points of failure exists that allow for ongoing abuse and insecurity in the above system: a) Sender and receiver are anonymous—thus neither party in the email transaction has a high level of assurance of the legal identity of the other user. b) The Sender cannot be assured that the message will be encrypted between MTAs. c) Even if the Sender had assurance that the channel was encrypted between MTAs, the Sender has no assurance that the Email will be encrypted between the MDA 90 and Recipient 100.

A PEM Operator is the entity or organization that manages and operates the PEMS. Most of the components that comprise the PEM architecture are computer servers, or more specifically, software residing on computer servers connected to the public network (or "Internet"). Any computer server which comprises the PEM invention can be logically federated across many servers to provide for scalability of the system.

Figure 2:
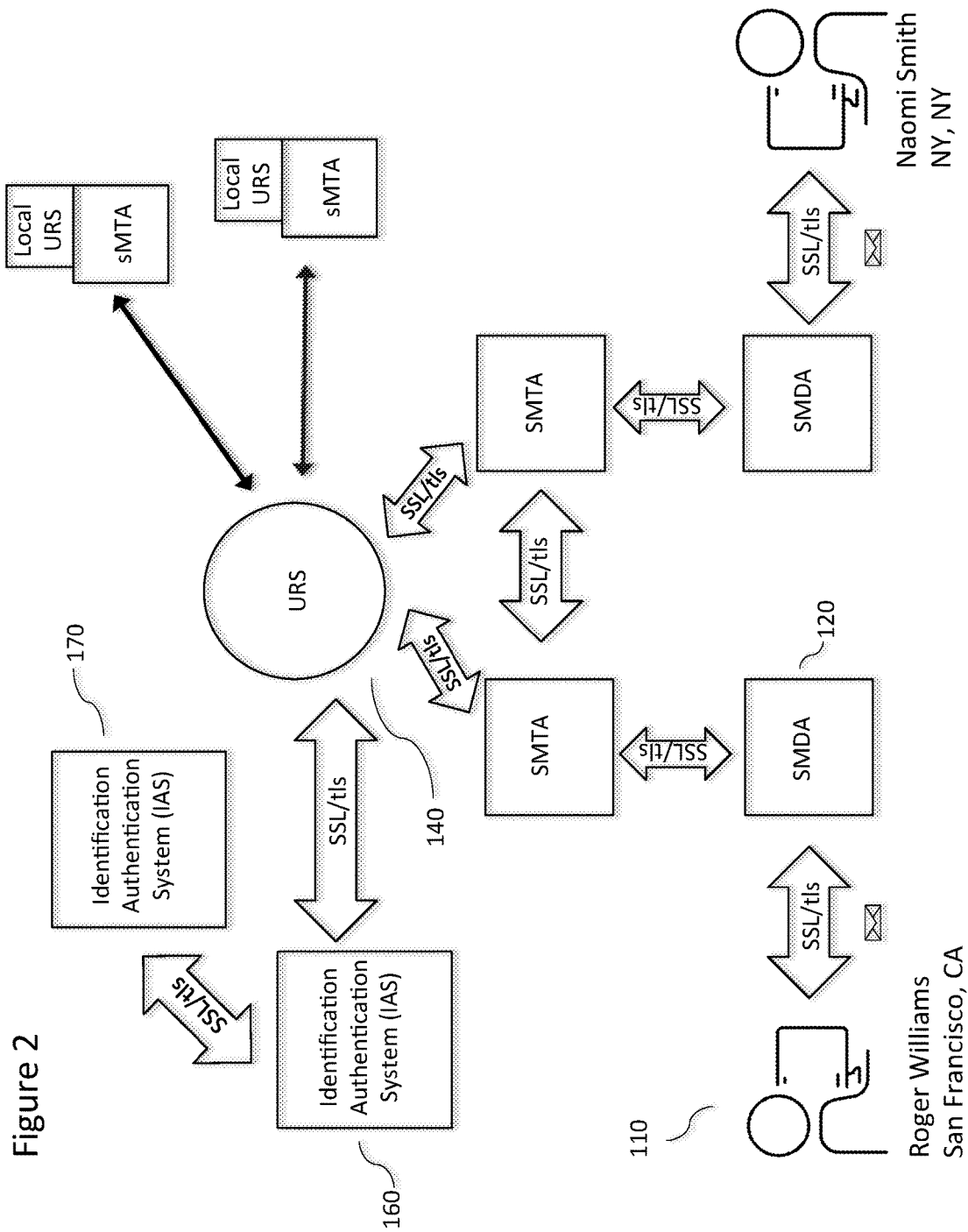
FIG. 2 is an architectural diagram of a preferred embodiment of a publically available protected electronic mail system.

(See FIG. 2): A Mail Client 110 (or "Email Client") is software which a User uses to store, view and send email. The Mail Client can be software installed on a local device such as a computer or mobile device which stores email in memory on the device or can be software accessed remotely, such as at a website ("webmail"). The Mail Client 110 performs all the functions necessary to create and send mail to an SMDA 120 as well as to fetch/retrieve mail from an SMDA 120. By policy, the SMDA 120 can only connect to the SMTA 130 via encrypted communications—any other connection request will be refused by the SMTA 130.

A Sender is a User who sends a Message. A Recipient is a User who receives a Message.

sMail (secure email) or sMail message is the electronic message created by a Sender using PEM and sent (or intended to be sent) to a Recipient using the PEMS. A Message at minimum contains sMail Address of the Recipient and the sMail Address of the Sender.

A sMail Address (secure email address) is an entirely unique combination of numbers and/or letters which is used to identify a User Account on the PEM system. A standard email address used in the conventional email system can also be used in the PEM system as well to double as the sMail address, though it is not required. For example, the address jim@ISP.com might be used as an email address on the current public email system AND registered as a sMail address on the PEMS. When the address is used by a Sender within the PEMS, the secure message will be routed via the PEM rather than via conventional email servers.

In one embodiment of the invention, PEM utilizes the publically available Domain Name System (DNS) to query the MX records and accompanying IP addresses of inbound mail hosts, responsible for accepting email for a particular domain as is defined by the Simple Mail Transfer Protocol (SMTP) (defined by IETF, RFC 821). Differing from the current IETF standard, however, a PEM SMTA will only communicate with a PEM enabled host (another SMTA) and will refuse to send sMail to a non-PEM enabled host. In this embodiment, a PEM Enabled Domain is a domain which has been enabled to receive secure mail via the PEMS. This means that the domain is listed on the public DNS and points to an SMTA which serves as the domain host which can receive secure PEM communications from another SMTA and simultaneously serves as a conventional MTA which can receive conventional email from another MTA in according with the current state of the art.

In a second embodiment of the invention, each user account has an associated SMTA and the SMTAs IP address on the Internet registered in the URS and use of the existing domain name system is not required.

A URS 140 is a computer server which provides a directory of Users and SMTAs. The directory is a collection of records stored in a database. A typical User Record would contain the following fields (type of field):

---

User ID, (System, Functional)
Parent Account (Optional, Identification, Functional)
First Name, (Identification)
Last Name, (Identification)
sMail Address, (Functional, Authentication)
City, (Identification)
State, (Identification)
Zip, (Identification)
Key Unique Identifier - Tax id/SSN, (full or partial), (Key Identification)
Password, (Authentication)
Challenge Question, (Authentication)
Challenge Response, (Authentication)
Auth #, (Identification)
Multicast Permissions (Rules)
Block List (Permissions)
Privacy Settings for the User Directory:
    Directory Lookup (Privacy)
    Sender Verification (Privacy)
    User Verification (Privacy)
Associated SMTA (Optional - to be used in a second embodiment of the invention). The Associate SMTA is cross referenced with the SMTA Table.

---

The URS System maintains a table of SMTA records. An SMTA record contains at minimum, the IP address of the SMTA. The SMTA Table can be regularly downloaded by each SMTA and maintained on each SMTA. As described below, incoming session/connection 'sendmail' requests (requests to send mail to SMTA from any other 'MTA' which is not 175 registered in the SMTA Table will be refused.

An SMDA (secure Mail Delivery Agent) 120 can be logically combined with an SMTA or separate. An SMDA stores messages so they can be picked up by the sMail Client at the User's convenience. An SMDA may store a message for an unlimited period of time before it is retrieved. If separate from the SMTA, an SMDA has an assigned SMTA and connects to the SMTA via an encrypted channel.

An SMTA (secure Mail Transfer Agent) 130 is synonymous with the MTA used when sending email in the current state of the art public email network with additional security characteristics. 1) All communications in and out of an SMTA are encryption enforced—sMail sent between SMTAs is always encrypted; 2) When sending email the SMTA connects to a URS to authenticate the Sender account; 3) An SMTA is registered on the URS, and 4) an SMTA will only route sMail to another SMTA.

In a preferred embodiment of the invention, an SMTA discovers the IP address of another SMTA using the conventional DNS system, but routes sMail to a specific port on the receiving SMTA which signals that the communication is a secure PEM communication.

In a second embodiment of the invention, the IP addresses of SMTAs are registered on the URS and each PEM user account is associated with an SMTA. This embodiment does not require use of the public DNS. The registration process for the SMTAs on the URS is not described herein.

While the network security and security of the physical location of the URS and SMTA servers is not described herein, note that for the practical application of the PEM invention, the security of the URS and SMTA servers is critical to operating a secure and effective PEM system.

A Registration Server 160 provides an ID gateway by which new Users can establish a User Record on the URS. As an ID gateway, the Registration Server prevents non-identified users from accessing or using the PEMS. I can also prevent the creation of multiple accounts for the same user.

The Registration Server provides new Registrants the fields by which to enter registration information which is stored in the User Record. Additionally, the Registration Server 160 connects to an Identification Authentication System (IAS) 170. The IAS provides a system by which a new registrant's legal identity can be verified prior to establishing the User Record. The URS matches every PEM User Account to the legal identity of the User associated with that account, thus, the IAS verifies the User legal identity prior to setting up the User Record on the URS.

A popular type of IAS uses KBA ("knowledge-based authentication,") a method used commonly by credit bureaus when verifying individuals before allowing access to credit information via the Internet. Using, KBA, The Registrant is presented with a series of top-of-mind questions utilizing relevant facts about the Registrant based on questions developed from information that is obtained from public records and commercially available databases. Because the answer choices presented are unique to each individual, correctly answering the questions greatly increases the likelihood that the person answering the questions is actually the claimed identity of the Target. The objective of the IAS system is to increase the likelihood of a positive identification to a point beyond reasonable doubt—i.e. "passing the identity test."

Another type of IAS leverages an existing internet account which has already established the legal identity of the user. To do so, the user logs into the existing account, such as a user account at a bank website, where the user has a verifiable EI, then the user provides permissions for the existing account to pass EI credentials to the PEM IAS. Current established systems such as the open standard, OAUTH, provide for the functionality necessary to authenticate and share credentials among the existing account and the PEM IAS.

If the Registrant passes the identity test, then the User Account will be allowed to be created on the URS. Note that there are currently several IAS systems on the market and the actual functions of the IAS are not described herein.

Accordingly, the PEM system and method in accordance with the invention is a publicly available secure email network for the exclusive use of Identified Users who have registered with the PEM system. All PEM users, whether individuals or business entities, must register on the system and be tested for their legal identity to be able to send mail to anyone else in the network.

The PEM system and method in accordance with the invention has a novel architecture which enables the following characteristics, the sum of which comprise a highly secure, highly effective secure email network:

1) All Users on the PEM are Identified: When registering a new account, the registrant (new User) must prove the registrant's legal identity with a high degree of assurance before receiving an account. Several systems exist by which the User can prove his/her legal identity. Once the User's legal identity is proven, the identifying information, such as first name, last name and address is designated as the Registrant's electronic identity (EI), is stored in a URS 140 and can be used on an ongoing basis by other PEM users to verify the identity of the Registrant.

With an EI for every registered user of the PEMS, a governing body managing the system can remove Users from the system permanently or even levy fines against Users who abuse the system in some way. Thus, identities can be blacklisted and forbidden to re-register. Additionally, when one User exchanges a message with another User, each User will be able to verify the identity of the other User with a high level of assurance.

A User may choose to make available only select parts of his/her EI to be used by other parties (Users) for user verification. For example—a User might typically allow another User to match the last 4 digits of a tax ID number without exposing the entire tax ID number.

2) The system is Protected from non-identified users: While a PEM system is 'connected to,' or effectively runs on top of, the public network (internet), unlike the current email system, PEM does not allow any electronic mail generated from outside PEM to reach a PEM User. No electronic mail can be sent into the system from outside the system. Both Senders and SMTAs 130 must be registered to be permitted to send sMail.

This ensures that 1) all mail received on the PEM system can be attributed to an identified sender and all mail is 2) is routed by identified SMTA 130 which can assure that the mail is routed via a secure channel.

A sender can optionally identify the recipient before sending mail to that recipient by performing a record lookup on the URS 140 and a recipient can see the legal identity of the sender by performing a lookup on the URS 140.

3) All communications are encrypted. As with a common VPN, all PEM communications are sent across a public network (the Internet) but are encrypted to protect communications from being intercepted by anyone other than the intended party.

4) The PEM is most effective in providing unique value if the system is Publicly Available, i.e. access and use is not proprietary to any group, business or organization. Anyone can join the system as long as the user can establish an EI that meets the minimum threshold of assurance. This is important to achieving the business goal of providing a ubiquitous protected electronic mail system. To maintain greater control over Users, the governing body may elect to allow only one User account per ID (i.e. person or business entity).

In addition to the technical characteristics of a PEMS, the PEM system and method in accordance with the invention may incorporate a business model. The value of a PEM can further be improved by adding Policies and Business Rules which are supported by the PEM technical architecture or by threat or by policing and the threat of permanently revoking the privilege to use the system, a function which is supported by the technical architecture. These Policies and Rules are established and enforced by a governing body (probably the same business entity which operates the PEMS). The governing body can revoke an account on PEM at any time and refuse a PEM account to current Users or applicants/new registrants who break the governing rules or cannot achieve a properly verified EI. A key policy to be included in the system is Multicasting Restrictions (the ability to send sMail to more than one User at a time). Multicast Restrictions limits Users to a specific number of recipients per electronic message or per a given amount of time. For example, the multicast policy might allow a User to send an email to as many as ten people at one time with no more than 100 emails per day.

To exceed this number, the User can apply for a multicast registration or a multicast license. This multicast license allows senders to exceed the standard limits for multicasting a daily sending in agreement with certain limitations and additional rules designed to protect all Users of the network. Other rules and policies might define spam (sending unsolicited mail) on the system and provide for restrictions or account revocation in case of abuse.

Process Flows for the PEM System: The two primary process flows for a PEM are User Registration and Sending a Message. Secondary process flows include, using an Authorization Code and User Verification.

Figure 3:
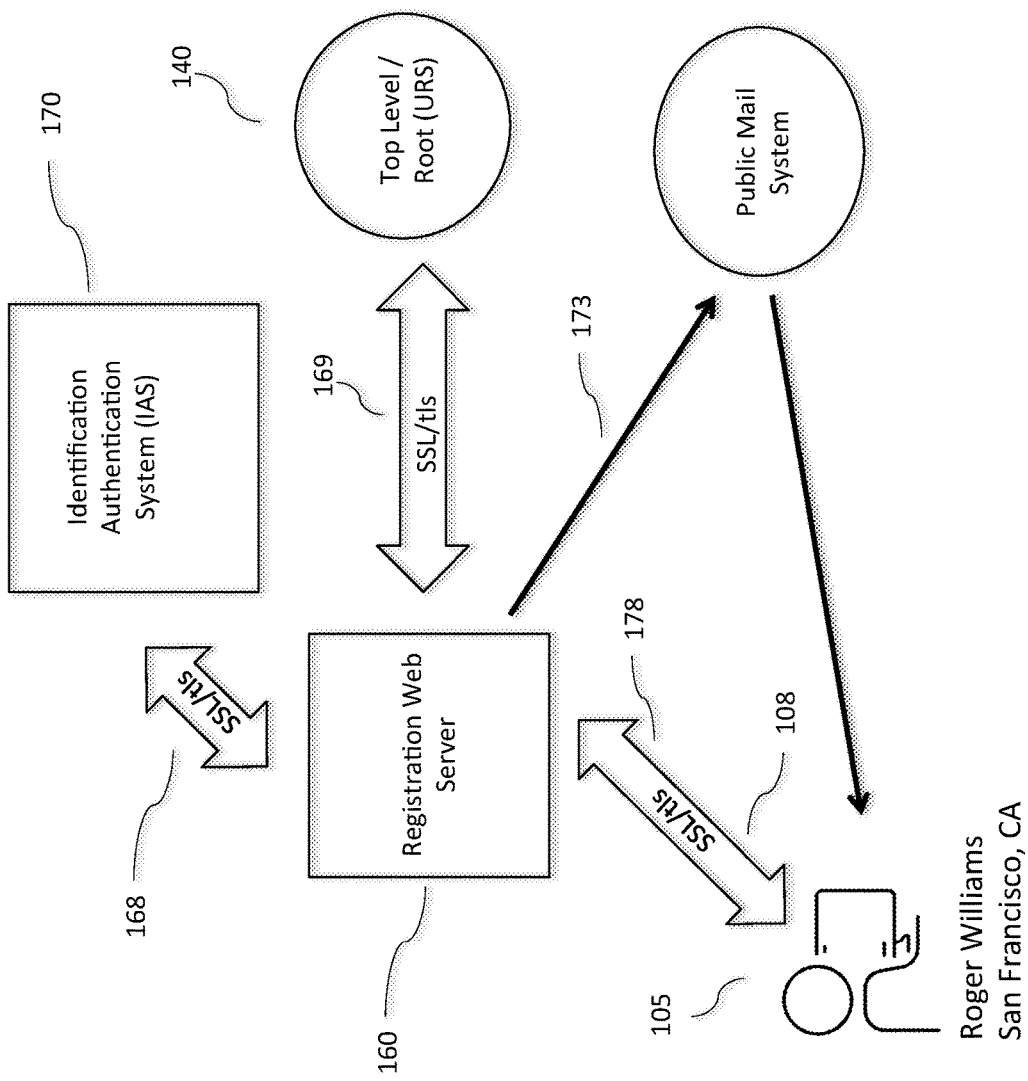
FIG. 3 is a diagram illustrating a method for registering a user account in accordance with the invention.

(see FIG. 3) A person desiring to register for the PEM system, Registrant 105, accesses the Registration Server 160 via a secure connection on a public computer network 108. All secure connections mentioned herein can be established using conventional encryption methods such as SSL or TLS. The Registrant 1 is then presented with form fields in which to enter required personally identifying information which will be used to create the User Record on the URS 140. The User also makes Privacy choices for the Privacy Settings for the User Directory such as what personally identifiable information to make available to other Users on the PEM system.

The User submits the registration data for the User Record. Upon 'submit,' the Registration Server 160 performs an account lookup on the URS 140 using a 'Key Identity Field' which is globally unique to that Registrant, for example the standard email address of the user being registered or Tax ID number for a business or Social Security Number for an individual. If the lookup process discovers an existing User Account with a matching Key Identity Field, then an "Account already exist" message will be returned to the Registrant and the new account will be denied. Limiting entities to a single (or limited number of) accounts allows a PEM operator to monitor and control Users. If an account is compromised or a member breaks rules (for example, a business sends SPAM), the PEM operator can permanently remove the User account and disallow re-registration by that entity (individual or business).

If the 'Key Identity Field' does not match that of an existing User Account, then PEM must verify that the Key Identity Field and/or other identifying information is actually that of Registrant. The Registrant must also provide an email address unique to the PEM system which will serve as that User's secure email address on the PEM system, or sMail address. The sMail address can be unique to the PEM system or can be another common email address which doubles a sMail address and common email address.

The Registration Server 160 utilizes an IAS 170 to verify the legal identity of the Registrant 105. In this example, using Knowledge Based Authentication, the User is presented a series of questions generated by an IAS service (likely a third party organization) which only the actual person identified would answer correctly. There are several methods by which the authenticity of the Registrant 105 identity can be tested using the IAS. Two are noted here— a) Method 1: The Registrant's 105 connection (session) can be redirected by the Registration Server 160 to the IAS 170 (possibly operated by a third party operator) along with a token containing a temporary ID for the Registrant 105. The Registration Server 160 sends a message via secure communications 168 to the IAS which contains the temporary ID and the identifying information inputted by the Registrant (the "Identity Claim"). The Registrant is verified/passed (or not verified/failed) against the Identity Claim by the IAS service and redirected back to the Registration Server 160. A pass/fail message is sent via a Secure Channel 168 from the IAS 170 directly to the Registration server 160 in a communication containing the temporary ID.

b) Method 2: The Registration Server 160 passes a message to the IAS via a Secure Channel 168 which contains the Identity Claim of the Registrant along with a transaction ID. The IAS 170 returns a series of Knowledge Based Authentication questions to the Registration Server 160 along with the transaction ID. The Registration Server 160 presents the questions to the Registrant 105. The Registrant 105 answers the questions via a User Interface on the Registration Server 160 via a secure connection 108. The answers are then sent to the IAS 170 via the Secure Channel 168 along with the transaction ID. The IAS 170 returns grades the answers and returns a verified/passed (or not verified/failed) message to the Registration Server 160 along with the transaction ID.

If the Registrant fails the IAS test, then that Registrant will be refused registration on the PEM system. If the Registrant's information is passed by the IAS (i.e. the IAS returns a "pass"), then the User Account is created. To create the User Account, the Registration Server 160 sends a message to the URS 140 via a Secure Channel 169 containing the registration information entered by the Registrant 105. The URS 140 creates a User Record in the URS database using the registration information of the Registrant 105, including identifying information and chosen authentication credentials. The Registrant will utilize the authentication credentials to access the PEM system (e.g. user name and password) as described below. The Registrant is now a User.

In a second embodiment of the invention, the new User Account, at the time of registration is associated with a specific SMTA which is the SMTA to which sMail sent to that User Account will be sent. The associated SMTA is recorded in the User Record.

Regular user authentication is required any time a User sends mail on the PEM system or User accesses data on the PEMS system, including inbound sMail or when performing directory lookups. This required authentication is a basic security measure and is assumed, not called out, in the detailed description of the invention.

A user may choose a sMail address with a domain controlled by the PEM operator in which case the PEM can assure that the sMail address is unique at the time of registration by performing a lookup for the chosen sMail address.

If the user uses a domain name other than that controlled by the PEM operator, then prior to enabling a User Account, the PEM system verifies that the registered email address to be used for sMail is accessible and controlled by the Registrant. To do so, the Registration Server 160 utilizes a commonly utilized technique of sending an email 173 to the Registrant's 105 common email address containing unique information such as a secret code. Only a person with access to the email account can retrieve the secret code. The Registrant is then redirected (or instructed to revisit) 178 the Registration server 160 where the user enters the code, associating the code with the Registrant's newly formed sMail account. A properly entered code indicates has control of the common email account.

An Account Management function is also provided which will allow a User to access their account and modify modifiable data as appropriate. When a User Account is created, fields designated as "Identification" altogether comprise the User's "Electronic Identification" (EI). Primary ID Fields such as name and the Key Identifying Field are not changeable by the User without performing another IAS Identity test. This systemically protects from User's spoofing their name after registration. The ability to change Primary ID fields, however, is necessary such as in the case of a User's last name changing due to marriage or address changing due to a move.

For the remaining figures, assume that all electronic communications across the network are encrypted by default using SSL unless otherwise noted.

Figure 4:
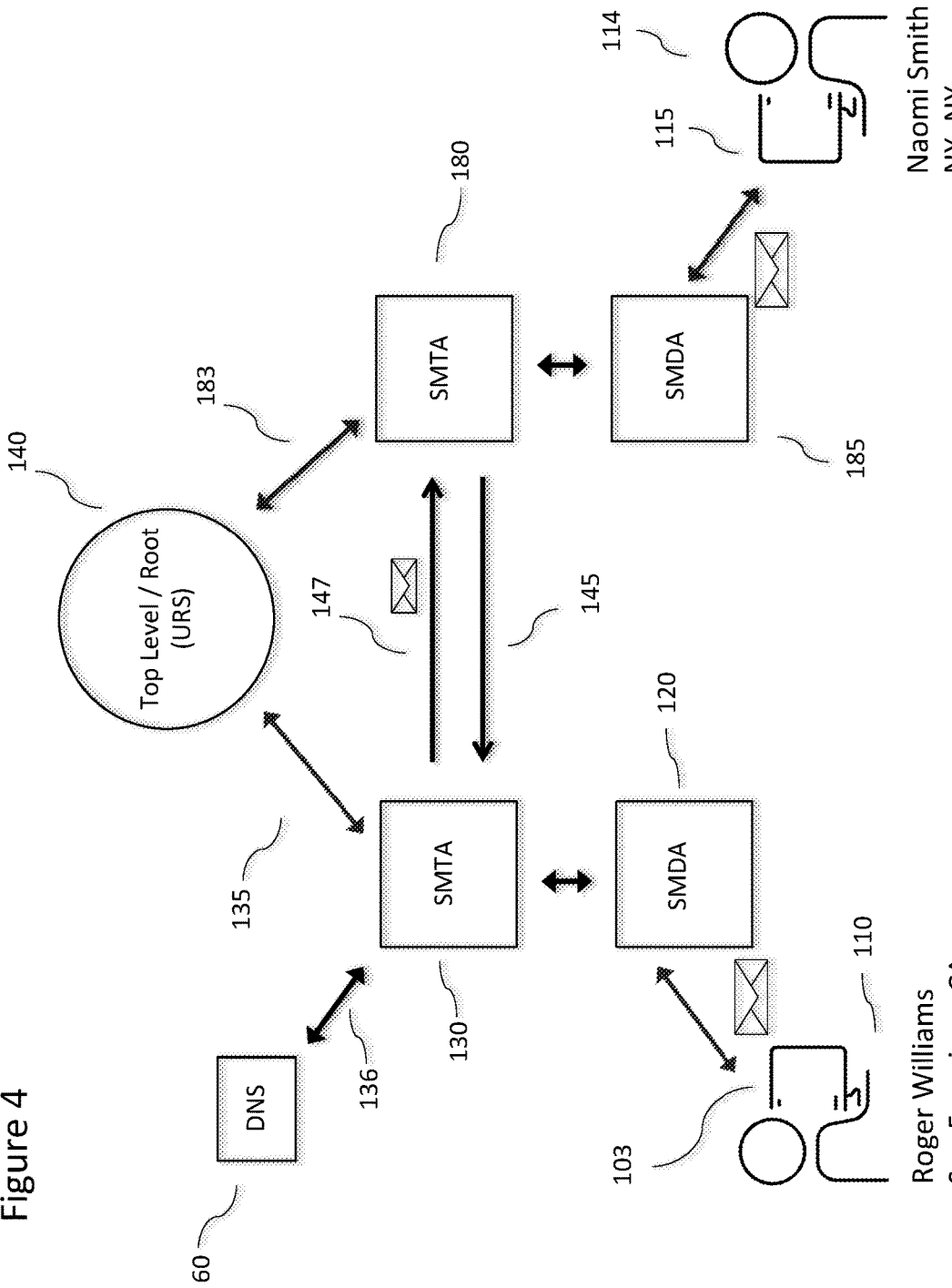
FIG. 4 illustrates a method for exchanging secure electronic mail in accordance with the invention.

(see FIG. 4) In a preferred embodiment of the invention, to send a message, a PEM User, Sender 103, utilizes a Mail Client 110 to create and send a sMail message. The Sender 103 enters his Authentication Credentials (e.g. user name and password) into the Mail Client 110 where the Sender 103 may choose to store the credentials for future use. Upon choosing to send the message, the Mail Client 110 routes the message, recipient sMail address and authentication information to the SMDA 120 which, in turn, routes the information to the SMTA 130. The SMTA 130 performs a lookup 135 on the URS 140 to 1) verify the authentication credentials of the Sender 103, 2) to establish that the recipient sMail address(s) is/are registered on the URS and 3) to determine if there is a violation of restrictions on the account such as multicasting on a multicasting restricted account. The URS 140 returns an "OK" or "false" response for each condition to the SMTA 130. If false for either condition, the sMail is rejected and an appropriate rejection message is returned to the Sender 103.

A false message is returned by the URS for various reasons including, but not limited to, no match for the inputted credentials, the sender's account has been revoked, the sender is attempting multicasting on a multicasting restricted account.

If the conditions are returned from the URS 140 to the SMTA 30 as OK, i.e. the sender account is authenticated, the requested action is valid, and the recipient sMail address(s) is/are present on the URS, the sMail is accepted and routed as follows.

The returned OK message contains a "Sender ID Bundle" (containing at least a first name, last name and physical address information, such as city and state of the Sender) to the SMTA 130. The SMTA 130 optionally inserts the Sender ID Bundle into the appropriate fields in the Email Header. (The "Email Header" can use the current format as defined by Internet standards RFC 5321 and RFC 5322 with a few additions necessary for the PEMS.) Thus, the "From" field that the Recipient will view when the Email is received will be generated from data from the User Record on the URS 140, not by any data entered by the Sender 103 in the Sender's Mail Client 110. The identifying information will be contained in the Email Header under the appropriate fields: Sender's Name, Sender's sMail, Sender's City, Sender's State, etc.) and cannot be spoofed. In effect the PEM system is spoof proof.

The Recipient's Mail Client may or may not be enabled to conveniently display the physical address information, although the data will be available as long as the Recipient can read the Mail Header. By reading the mail header, the recipient has a very high level of assurance of the legal identity of the Sender 103.

The SMTA 130 then performs a DNS Lookup 136 from a DNS Server 60 to query the MX record (IP address) of the receiving SMTA 180, then sends a request 145 to the IP address of the SMTA 180 requesting to open a secure session on port 7367 (or other unique port which identifies the request as a PEM request). The SMTA 180 recognizes that the request is suggesting that it is from another SMTA since it is over port 7367. The SMTA 180 then verifies that the sending SMTA 130 is a registered PEM SMTA by querying 183 the URS 140 or optionally by querying a local SMTA Table (if the receiving SMTA 180 maintains an SMTA Table). If the IP address of the server making the request to send open a secure connection is verified as a registered SMTA, then the connection is established and the sMail is routed over a secure connection 147 to from the sending SMTA 130 to the receiving SMTA 180.

A method for verifying SMTAs as well as to establish a secure connection between SMTAs is to setup a private certificate authority supporting the SSL or TLS protocols between the SMTA servers. In this case, each SMTA contains a server certificate issued by certificate authority operated by the PEM Operator or a third party certificate authority. When a first SMTA attempts an SSL (or TLS) connection to a second SMTA, the identity of the server is validated and the communications secured via the standard SSL (or TLS) protocols. This is the same method recommended for establishing secured connections between all computer servers in the PEM architecture.

The receiving SMTA 180, from this point performs the same functions as a conventional MTA and directs the mail to the SMDA 185, where it is fetched by (or 'pushed to' in some instances) the Recipient's Mail Client 115. As a policy, both the SMTA 180 and SMDA 185 'require' that all network communications travel through encrypted channels. Non-encrypted session request will be refused by any PEM server.

Figure 5:
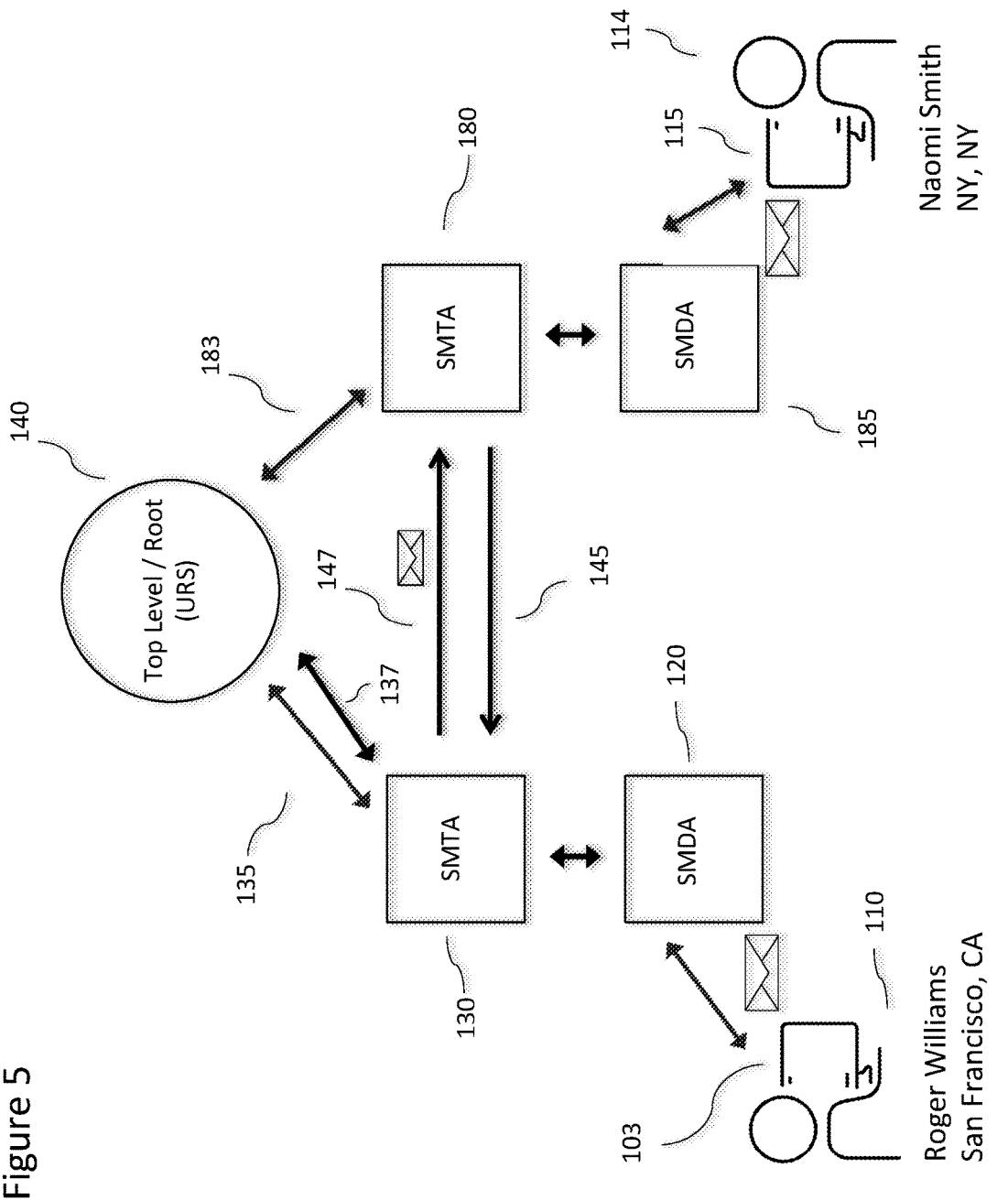
FIG. 5 illustrates a second method for exchanging secure electronic mail in accordance with the invention.

(See FIG. 5) In a second embodiment of the invention, the method described in the preferred embodiment is followed with exception of the DNS lookup 136. Instead of a DNS lookup as described in the preferred embodiment, upon the SMTA 130 performing a lookup 135 on the URS 140 as described in the preferred embodiment, the URS 140, in addition to the steps described in the preferred embodiment, performs a lookup for each recipient sMail address and retrieves the IP address of the Associated SMTA. The URS returns 137 the IP address of the Associated SMTA of each recipient sMail address to the sending SMTA 130. In turn, the sending SMTA 130, routes the sMail to the recipient Associated SMTAs via the same method, beginning with a request 145 to open a secure session on port 7367 as specified in the preferred embodiment.

The main functional difference between the preferred embodiment and second embodiment of the invention is that in the preferred embodiment, sMail is routed to the appropriate SMTA using the domain name of the registered sMail address and the commonly accepted public DNS system. In this embodiment, the user might use the same email address for common unencrypted email as for PEM routed sMail and both are routed to the same MTA (SMTA). This would allow for a webmail provider, or other ESP, to offer both sMail and common unencrypted email in the same user environment. For example, blake@webmail.com will route both sMail and regular email to the registered webmail.com MTAs according to the public MX records on the DNS.

In the second embodiment, sMail is routed independently of the public DNS system. In this scenario, sMail sent to blake@webmail.com would be routed to the SMTA server address (IP or otherwise) that is associated with the sMail account on the URS. This could be an SMTA physically and logically separate from the webmail.com domain as identified on the public DNS.

The User Directory on the URS can be used to allow Users on the system to lookup other Users on the system in order to 1) verify identity against a known sMail Address (see User Verification below); or 2) to lookup an sMail Address of a known identity in order to contact that person.

For decades, the local white pages of the phone book served as a directory which could be used for "open searches" to locate and ultimately contact individuals and businesses. With conventional email, because of the anonymity of email senders and the vast public access to one's standard email inbox, concerns for fraud and spam have eliminated the practicality for such a directory in the current public email system. In contrast, PEM provides a spam-free environment where all Users are associated with a legal identity and mailboxes are protected from mass intrusion. Thus, some Users may choose to make their PEM sMail address available for open searches by other registered PEM Users. A PEM User can choose which parts of the PEM User Account (User Info) to make discoverable. For example, some users may choose to simply make their name and city available to open searches, while others may choose to make their entire address available.

To perform a directory lookup on the URS, a PEM User submits data to the URS. The URS performs a query on the database of user records to find a match for the submitted data, and depending on the type of lookup, returns data or a confirmation or rejection. The invention is indiscriminate of the method by which lookup data is submitted to the URS though the following examples provide that the user submits data to the URS via a web server.

The URS technically provides users with three basic types of searches: 1) Directory Lookup—when second User wishes to contact a first User and has the name and potentially other identifying information, but doesn't have an sMail address; 2) Sender Verification—Identifying information of the Sender made available to the sMail Recipient either in the header of the sMail or via a directory lookup of the Sender made available to the Recipient; or 3) Recipient Verification—typically used when a first User already has an sMail address for a second User and wishes to verify the legal identity of the second User before contacting.

Figure 6:
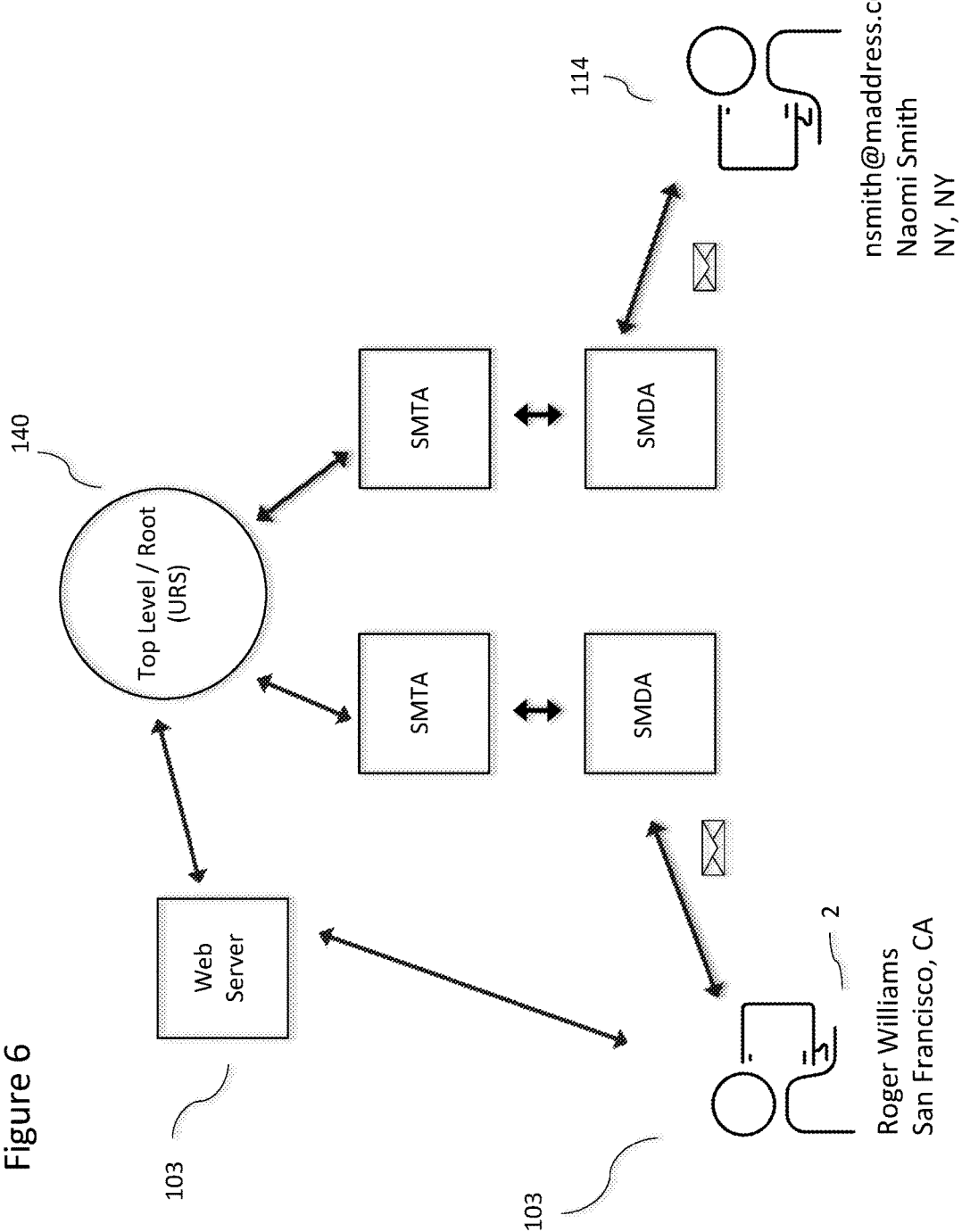
FIG. 6 illustrates a method for performing a directory lookup in accordance with the invention.

(see FIG. 6) User Verification works inversely of a Directory Lookup. With User Verification, a first User 103 has been presented a sMail address that is presumed to be that a second User 114, but wishes to verify the association with the second User 114 prior to committing to the sMail address being valid. In this case, the first User is provided a form via a web server 162 in which to enter a questioned sMail address. The web server 162 could be the same logical server or a different logical server as the Registration Server. Upon submitting the form, the web server 162 sends the questioned sMail address to the URS 140 which performs a lookup. If a record is found containing the questioned sMail address, then the URS 140 retrieves and returns other identifying information from the User Record containing the sMail address. The first User 103 can then compare that information with known identifying information to confirm that the sMail address entered is correctly associated with the intended second User 114.

User Verification can be extremely valuable when sending highly sensitive information among Users since a Sender can verify that he properly entered the sMail address of the Recipient prior to sending the document. This can help to eliminate mistakes made when mistyping an address or when a sMail address has been reassigned to a different identity/User.

For example, if a first User decides to register a PEM enabled sMail address with his bank and gives the bank the bank representative the sMail address over the phone, the bank representative can use a User Verification to verify the sMail address prior to permanently entering it into the User's account at the bank. A Doctor can verify the insurance company she is forwarding patient records to, and so on.

In another method, a first User provides a Second User an Auth # as follows. When a User registers an account on the PEMS, the User is asked to choose an Authorization # (Auth #) which is stored in the User Account on the URS. The Auth # is a unique number (3-5 digit) chosen by a Registrant during the registration process and initially only known by the Registrant/New User. When a second User 114 wishes to enable a first User 103 to be able to perform a User Verification on the second User 114, the second User 114 provides the first User the Auth # by alternative means—standard email, by phone, etc. When the first User 103 performs the lookup using the web server 162, the first user is presented a form field requesting the Auth #. The first User 103 enters the Auth # and submits it along with the presumed sMail address of the second User 114. The web server passes the information to the URS 140 which performs a lookup. If the sMail address and Auth # match that of a User Record, then an OK message is returned via the web server 162 to the first User 103 who now has confirmed that the sMail address entered is correct.

Two types of User Verification are supported: Active and Passive. Using Active verification, a first User submits information to the URS, typically via a web server, which the first User wants to verify for a second User. For example, a first User will submit the presumed sMail Address and postal code of a second User. The URS will perform a lookup and return either a true or false result to the first User. If true, then the first User has confirmed the accuracy of the information entered. If false, then a User record doesn't exist in the URS with matching information to that submitted. Using Passive verification, a first User submits a presumed sMail address of a second User. The URS performs a lookup and if a User Record is found containing the submitted presumed sMail address, the URS returns other identifying information from the User Record which the first User can assist the first User in determining whether the sMail address was entered correctly.

PEM is designed to limit a single entity, individual or business, to a single account on the PEM system. This allows a PEM Operator control to exercise governance over the system. Because business entities typically represent many Users and large businesses, especially, might represent many divisions and many users within those divisions, the PEM system and method provides for a User Account to be associated with a parent account in the URS. In this case, the user account associated with the Parent account becomes a child account. The parent account is recorded in a field in the User Record and policies in which case permissions and policies for the User Account will be inherited from the parent account. When providing for policies and permissions, a PEM Operator can remove or add privileges for the parent account which will propagate across its child accounts. The PEM operator could also remove either an individual child account without affecting the parent account or could remove the parent account which, in turn, would remove all child accounts associated with that parent.

The invention claimed is:

1. A secure messaging system for transmitting sMail, comprising:
   a User Record Server (URS) comprising a database having a plurality of Private Electronic Mail (PEM) user accounts corresponding to a plurality of owners, each PEM user account of said plurality of PEM user accounts comprising a record that includes identifying information about each owner of said each PEM user account, including a certified legal identity for each user, an sMail address for each user to be identified to other users of the system when sending and receiving secure transactions, and authentication information for each user, and a Sender ID for said each PEM user account;
   an Identification Authentication System (IAS), configured to control the addition of new PEM user accounts to the URS;
   a registration server coupled to the User Record Server (URS), said registration server configured to create Private Electronic Mail (PEM) user accounts;
   a Secure Mail Delivery Agent (SMDA), coupled via network communication with said URS, said SMDA configured to provide a storage area for inbound sMail and further configured to require authentication via the URS that a Sender ID bundle in a message header of each incoming message matches the Sender ID of at least one of said plurality of PEM user accounts before delivering said incoming message;
   a first Secure Mail Transfer Agent (SMTA), coupled via a first connection to said SMDA and via a second connection to a public network, said first connection being encrypted,
   wherein said first SMTA is configured to insert a Sender ID bundle into sMail headers when routing outbound sMail, and further configured to establish encrypted channels for the transmission of sMail over a public network.

2. The system of claim 1, further comprising a second SMTA, wherein said first SMTA is configured to establish encrypted connections with said second SMTA for the transmission of messages securely over a public network.

3. The system of claim 2, wherein the first SMTA is configured to connect to the second SMTA via a unique port.

4. The system of claim 2, wherein each PEM user account of the plurality of PEM user accounts includes an SMTA identification for each user account, each SMTA identification identifying a unique SMTA, such that messages are routed via the unique SMTA identified by said SMTA identification.

5. The system of claim 2, wherein each SMTA is also an SMDA and the functions described are combined.

6. The system of claim 1, further comprising an authentication gateway coupled to said first SMTA, said authentication gateway being accessible via the internet, said authentication gateway configured to allow access via the internet only upon authenticating that the access is associated with a PEM user account.

7. The system of claim 1, wherein each PEM user account contained in the URS includes a User ID, parent account, first and last name, sMail address, geographic address, key unique identifier, password, at least two challenge questions and a challenge response for each of said challenge questions, an authentication number, multicast permissions, blocklist, and privacy settings, and associated SMTA.

8. A secure messaging system for transmitting sMail, comprising:
   a User Record Server (URS) comprising a database having a plurality of Private Electronic Mail (PEM) user accounts corresponding to a plurality of owners, each PEM user account of said plurality of PEM user accounts comprising a record that includes identifying information about each owner of said each PEM user account, including a certified legal identity for each user, an sMail address for each user to be identified to other users of the system when sending and receiving secure transactions, and authentication information for each user, and a Sender ID for said each PEM user account;
   an Identification Authentication System (IAS), configured to control the addition of new PEM user accounts to the URS;
   a registration server coupled to the User Record Server (URS), said registration server configured to create Private Electronic Mail (PEM) user accounts;
   a Secure Mail Delivery Agent (SMDA), coupled via network communication with said URS, said SMDA configured to provide a first storage area for inbound sMail and a second storage area for non-secure email, further configured to require authentication via the URS that a Sender ID bundle in a message header of each incoming message matches the Sender ID of at least one of said plurality of PEM user accounts before delivering inbound sMail to said first storage area;
   a first Secure Mail Transfer Agent (SMTA), coupled via a first connection to said SMDA and via a second connection to a public network, said first connection being encrypted,
   wherein said first SMTA is configured to insert a Sender ID bundle into sMail headers when routing outbound sMail, and further configured to establish encrypted channels for the transmission of sMail over a public network.

9. The system of claim 8, further comprising a second SMTA, wherein said first SMTA is configured to establish encrypted connections with said second SMTA for the transmission of messages securely over a public network.

10. The system of claim 9, wherein the first SMTA is configured to connect to the second SMTA via a unique port.

11. The system of claim 8, wherein each PEM user account of the plurality of PEM user accounts includes an SMTA identification for each user account, each SMTA identification identifying a unique SMTA, such that messages are routed via the unique SMTA identified by said SMTA identification.

12. The system of claim 11, further comprising an authentication gateway coupled to said first SMTA, said authentication gateway including an access port and configured to allow access via the internet only upon authenticating an incoming login as associated with a PEM user account of the plurality of PEM user accounts.

13. The system of claim 12, wherein each PEM user account of the plurality of PEM user accounts includes an SMTA identification for each user account, each SMTA identification identifying a unique SMTA, such that messages are routed via the unique SMTA identified by said SMTA identification.

14. The system of claim 11, wherein each PEM user account contained in the URS includes a User ID, parent account, first and last name, sMail address, geographic address, key unique identifier, password, at least two challenge questions and a challenge response for each of said challenge questions, an authentication number, multicast permissions, blocklist, and privacy settings, and associated SMTA.

15. A secure messaging system for transmitting sMail, comprising:
- a User Record Server (URS) comprising a database having a plurality of Private Electronic Mail (PEM) user accounts corresponding to a plurality of owners, each PEM user account of said plurality of PEM user accounts comprising a record that includes identifying information about each owner of said each PEM user account, including a certified legal identity for each user, an sMail address for each user to be identified to other users of the system when sending and receiving secure transactions, and authentication information for each user, and a Sender ID for said each PEM user account;
- a registration server coupled to the User Record Server (URS), said registration server configured to create Private Electronic Mail (PEM) user accounts;
- a Secure Mail Delivery Agent (SMDA), coupled via network communication with said URS, said SMDA configured to provide a first storage area for inbound sMail and a second storage area for non-secure email, further configured to require authentication via the URS that a Sender ID bundle in a message header of each incoming message matches the Sender ID of at least one of said plurality of PEM user accounts before delivering inbound sMail to said first storage area;
- a first Secure Mail Transfer Agent (SMTA), coupled via a first connection to said SMDA and via a second connection to a public network, said first connection being encrypted, wherein said first SMTA is configured to insert a Sender ID bundle into sMail headers when routing outbound sMail, and further configured to establish encrypted channels for the transmission of sMail over a public network.

16. The system of claim 15, further comprising a second SMTA, wherein said first SMTA is configured to establish encrypted connections with said second SMTA for the transmission of messages securely over a public network.

17. The system of claim 16, wherein the first SMTA is configured to connect to the second SMTA via a unique port.

18. The system of claim 17, further comprising an Identification Authentication System (IAS), configured to control the addition of new PEM user accounts to the URS.

19. The system of claim 15, wherein each PEM user account of the plurality of PEM user accounts includes an SMTA identification for each user account, each SMTA identification identifying a unique SMTA, such that messages are routed via the unique SMTA identified by said SMTA identification.

20. The system of claim 19, further comprising an authentication gateway coupled to said first SMTA, said authentication gateway including an access port and configured to allow access via the internet only upon authenticating an incoming login as associated with a PEM user account of the plurality of PEM user accounts.

21. The system of claim 20, wherein each PEM user account of the plurality of PEM user accounts includes an SMTA identification for each user account, each SMTA identification identifying a unique SMTA, such that messages are routed via the unique SMTA identified by said SMTA identification.

* * * * *